(12) United States Patent
Gray et al.

(10) Patent No.: US 11,778,037 B2
(45) Date of Patent: Oct. 3, 2023

(54) CONCURRENT TLS DATA STREAMS USING A SINGLE HANDSHAKE

(71) Applicant: International Business Machines Corporation, Armonk, NY (US)

(72) Inventors: Michael W. Gray, Guanaba (AU); Narayana Aditya Madineni, Southport (AU); Leigh S. McLean, Nerang (AU); Stephen J. McKenzie, Mudgeeraba (AU)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 17/469,356

(22) Filed: Sep. 8, 2021

(65) Prior Publication Data

US 2023/0070421 A1 Mar. 9, 2023

(51) Int. Cl.
*H04L 67/141* (2022.01)
*H04L 69/326* (2022.01)

(52) U.S. Cl.
CPC .......... *H04L 67/141* (2013.01); *H04L 69/326* (2013.01)

(58) Field of Classification Search
CPC ............................ H04L 67/141; H04L 69/326
See application file for complete search history.

(56) References Cited

U.S. PATENT DOCUMENTS

| 10,462,116 | B1 | 10/2019 | Shariﬁ Mehr |
| 2017/0223053 | A1* | 8/2017 | Dhanabalan ............ H04L 67/14 |
| 2018/0316724 | A1 | 11/2018 | Reddy |
| 2020/0153886 | A1 | 5/2020 | Dhanabalan |

FOREIGN PATENT DOCUMENTS

| CN | 109906625 A | 6/2019 |
| WO | 2017063537 A1 | 4/2017 |

OTHER PUBLICATIONS

Hiller, et al, "The Case of Session Sharing: Reliving Clients from TLS Handshake Overheads", https://ieeexplore.ieee.org/stamp/stamp.jsp?tp=&arnumber=9000667, Oct. 14, 2019 (Year: 2019).*
Benjamin, "RFC 8701: Applying Generate Random Extensions and Sustain Extensibility (GREASE) to TLS Extensibility", Jan. 2020 (Year: 2020).*
Benjamin, "Applying Generate Random Extensions And Sustain Extensibility (GREASE) to TLS Extensibility (RFC8701)", IP.COM Prior Art Database Technical Disclosure, IPCOM000261112D, Jan. 1, 2020, pp. 1-13.

(Continued)

*Primary Examiner* — Suraj M Joshi
(74) *Attorney, Agent, or Firm* — Stephanie L. Carusillo

(57) ABSTRACT

In an approach to efficient concurrent TLS data streams, a parent connection is established by performing a normal TLS handshake. A concurrent mode of operation is negotiated, where one or more child connections are established without using the TLS handshake. The one or more child connections are associated to the parent connection. Child application traffic secrets are derived for each child connection of the one or more child connections from application traffic secrets of the parent.

20 Claims, 4 Drawing Sheets

(56) References Cited

OTHER PUBLICATIONS

Disclosed Anonymously et al, "Method and System to associate resumed TLS 1.3 Sessions with a Single Parent Session Identifier", IP.COM Prior Art Database Technical Disclosure, IPCOM000259101D, Jul. 12, 2019, pp. 1-6.

Hiller et al., "The Case for Session Sharing: Relieving Clients from TLS Handshake Overheads", IEEE © 2019, DOI:10.1109/LCNSymposium47956.2019.9000667, pp. 1-9.

Leyden., "HTTP/3: Everything you need to know about the next-generation web protocol", The Daily Swig Cybersecurity News and Views, Oct. 27, 2020, pp. 1-4.

Rescorla, The Transport Layer Security (TLS) Protocol Version 1.3, RFC 8846, Retrieved from Internet/Mozilla on Sep. 7, 2021, pp. 1-160, <https://www.rfc-editor.org/info/rfc8446>.

Salowey et al., "Transport Layer Security (TLS) Session Resumption without Server-Side State", Network Working Group, Jan. 2008, pp. 1-20.

Sullivan., "Do the ChaCha: better mobile performance with cryptography", Cloudflare, Feb. 24, 2015, pp. 1-10.

"Patent Cooperation Treaty PCT International Search Report", International Application No. PCT/CN2022/116123, International Filing Date: Aug. 31, 2022, dated Nov. 30, 2022, 10 pages.

\* cited by examiner

CONCURRENT TLS DATA STREAMS USING A SINGLE HANDSHAKE

BACKGROUND

The present invention relates generally to the field of cryptographic mechanisms for secure communication, and more particularly to efficient concurrent Transport Layer Security (TLS) data streams.

TLS, and its now-deprecated predecessor, Secure Sockets Layer (SSL), are cryptographic protocols designed to provide communications security over computer networks, including the Internet. A primary use case of TLS is encrypting the communication between web applications and web servers, such as a web browser connecting to a website. TLS is also used to encrypt other communications such as email, messaging, and Voice over Internet Protocol (VoIP). TLS can be used on top of a transport-layer protocol like Transmission Control Protocol (TCP). There are three main components to TLS, namely encryption, authentication, and integrity. Encryption encodes the data being transferred to and from third parties. Authentication ensures that the parties exchanging information are who they claim to be. Integrity verifies that the data has not been forged or tampered with.

TLS handshakes are a series of datagrams, or messages, exchanged by a client and a server. A TLS handshake involves multiple steps, as the client and server exchange the information necessary for completing the handshake and making further conversation possible. The TLS handshake establishes a cypher suite for each communication session. The cypher suite is a set of algorithms that specifies details such as which shared encryption keys, or session keys, will be used for that particular session. During a TLS handshake, the two communicating sides exchange messages to acknowledge each other, verify each other, establish the encryption algorithms they will use, and agree on session keys. TLS handshakes are a series of datagrams, or messages, exchanged by a client and a server. A TLS handshake involves multiple steps, as the client and server exchange the information necessary for completing the handshake and making further conversation possible.

SUMMARY

Embodiments of the present invention disclose a method, a computer program product, and a system for efficient concurrent TLS data streams. In one embodiment, a parent connection is established by performing a normal TLS handshake. A concurrent mode of operation is negotiated, where one or more child connections are established without using the TLS handshake. The one or more child connections are associated to the parent connection. Child application traffic secrets are derived for each child connection of the one or more child connections from application traffic secrets of the parent.

DETAILED DESCRIPTION

Figure 1:
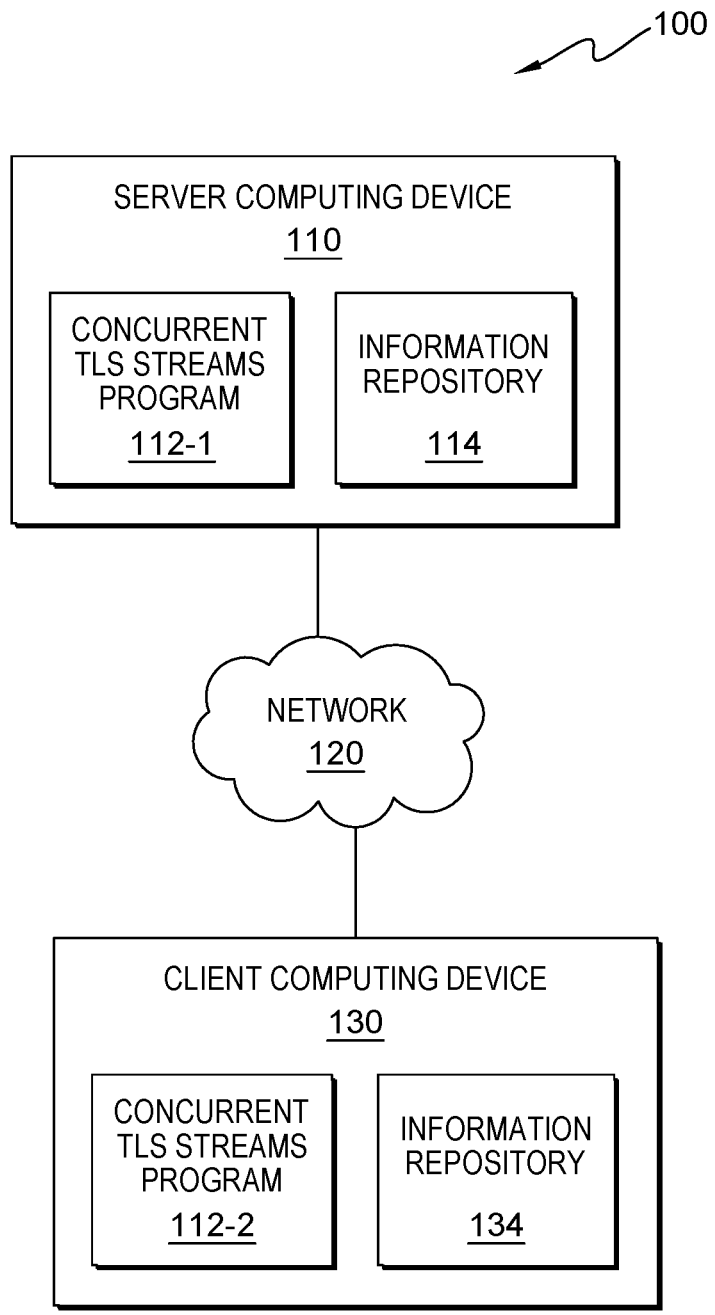
FIG. 1 is a functional block diagram illustrating a distributed data processing environment, in accordance with an embodiment of the present invention.

Client server applications use the TLS protocol to secure communications over a network. The TLS protocol has two phases, a TLS handshake phase and a TLS record (data exchange) phase. During the handshake, peers establish session keys (symmetric keys) using asymmetric cryptography. During the data exchange phase, peers, i.e., a client and a server, use less-intensive symmetric cryptography to exchange TLS application data using the established session key.

One problem with the TLS protocol occurs with applications using concurrent sessions to exchange data in parallel. To establish multiple concurrent data streams, each data stream requires a separate handshake to be initiated with the peer. As a handshake is CPU and roundtrip intensive, performing multiple handshakes adversely impacts performance due to extra latency and computational costs. The present invention addresses this problem by performing a single handshake that negotiates a TLS connection and establishes the record layer for the TLS protected data stream. For the concurrent sessions, session/connection keys for symmetric encryption are produced by iterating Key-Derivation Functions (KDF) on the initial session key and each connection key is assigned to a concurrent peer connection. This avoids the need for performing handshakes for each stream. Once the keys are assigned per peer connection, data can be streamed concurrently.

The present invention performs the handshake only for the parent connection. For all the remaining concurrent data streams, it does not run a handshake. This results in performance improvements. The present invention is similar to TLS KeyUpdate, which is used to indicate that the sender is updating its sending cryptographic keys, except that instead of keys being used serially they are used concurrently. This does not create a new attack vector as keys are still distinct and are all related to the parent session secrets as far as perfect forward secrecy is concerned.

In an embodiment of the present invention, a normal TLS connection is established between a client and a server with a TLS handshake. In an embodiment, this TLS connection becomes the parent session connection. In an embodiment, standard TLS Application Programming Interface (API) calls may be used to perform the handshake, e.g., Open_Socket( ) and Set_Socket( ). In an embodiment, the client and the server negotiate the concurrent mode of operation. In an embodiment, for security, the concurrent mode of operation is negotiated using an extension, e.g., GREASE, which is unblockable. In an embodiment, the extension may use a random number with embedded signal to indicate support for concurrent mode of operation, and to prevent middlebox blocking. A middlebox is a computer networking device that transforms, inspects, filters, and manipulates traffic for purposes other than packet forwarding. In an embodiment, an API call, e.g., Init_Socket( ), performs the full handshake between the peers.

In an embodiment, for each concurrent child connection a new record layer instance is created. In an embodiment, as in the creation of the parent connection, the Open_Socket( ) and Set_Socket( ) API calls may be used to create the child connection. In this case, however, the child connection references the parent socket connection through an attribute connecting the current child socket to the existing parent connection. In an embodiment, this will skip the handshake round-trip between the child connection and the server, and instead directly iterates the TLS using a KDF to produce new application traffic secrets, e.g., new record layer keys, from the parent session connection application traffic secrets.

In an embodiment, new TLS application traffic keys for both server and client are derived as per section 7.2 and 7.3 of RFC 8446 using the functions:
application_traffic_secret_N+1=HKDF-Expand-Label([client/server]application_traffic_secret_N, "traffic upd", " ", Hash.length); followed by [sender]_write_key=HKDF-Expand-Label(Secret, "key", " ", key_length); and finally [sender]_write_iv=HKDF-Expand-Label(Secret, "iv", " ", iv_length). In an embodiment, once the child connections have been established, the individual socket connections operate on the child sockets concurrently for read and write operations and close the child connections when done as normal.

In an embodiment, each peer maintains state information about the concurrent child connections to ensure that the child connections use the correct keys, and also to close each child connection once data is exchanged securely and the connection is no longer needed.

FIG. 1 is a functional block diagram illustrating a distributed data processing environment, generally designated 100, suitable for operation of concurrent TLS streams program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computing device 110 and client computing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between server computing device 110, client computing device 130, and other computing devices (not shown) within distributed data processing environment 100.

Server computing device 110 and client computing device 130 can each be a standalone computing device, a management server, a web server, a mobile computing device, or any other electronic device or computing system capable of receiving, sending, and processing data. In an embodiment, server computing device 110 and client computing device 130 can each be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, server computing device 110 and client computing device 130 can each represent a server computing system utilizing multiple computers as a server system, such as in a cloud computing environment. In yet another embodiment, server computing device 110 and client computing device 130 can each represent a computing system utilizing clustered computers and components (e.g., database server computers, application server computers, etc.) that act as a single pool of seamless resources when accessed within distributed data processing environment 100.

In an embodiment, server computing device 110 and client computing device 130 each includes an instance of concurrent TLS streams program 112. In an embodiment, server computing device 110 contains instance concurrent TLS streams program 112-1, and client computing device 130 contains instance concurrent TLS streams program 112-2. For simplicity, concurrent TLS streams program 112 will be discussed in reference to either concurrent TLS streams program 112-1 or concurrent TLS streams program 112-2. In an embodiment, concurrent TLS streams program 112 is a program, application, or subprogram of a larger program for unattended authentication in HTTP using time-based one-time passwords. In an alternative embodiment, concurrent TLS streams program 112 may be located on any other device accessible by server computing device 110 and client computing device 130 via network 120.

In an embodiment, server computing device 110 includes information repository 114, and client computing device 130 includes information repository 134. In an embodiment, information repository 114 and information repository 134 may each be managed by concurrent TLS streams program 112. In an alternate embodiment, information repository 114 and information repository 134 may each be managed by the operating system of the devices, alone, or together with, concurrent TLS streams program 112. Information repository 114 and information repository 134 are data repositories that can store, gather, compare, and/or combine information. In some embodiments, information repository 114 and information repository 134 are located externally to server computing device 110 and client computing device 130 and accessed through a communication network, such as network 120. In some embodiments, information repository 114 and information repository 134 are stored on server computing device 110 and client computing device 130, respectively. In some embodiments, information repository 114 may reside on another computing device (not shown), provided that information repository 114 and information repository 134 are accessible by server computing device 110 and client computing device 130. Information repository 114 and information repository 134 include, but are not limited to, network data, authentication data, datastore data, security data, server data, client data, time data, and other data that is received by concurrent TLS streams program 112 from one or more sources, and data that is created by concurrent TLS streams program 112. In an embodiment, information repository 114 and information repository 134 are the same repository, shared by both server computing device 110 and client computing device 130.

Information repository 114 and information repository 134 may be implemented using any volatile or non-volatile storage media for storing information, as known in the art. For example, information repository 114 and information repository 134 may be implemented with a tape library, optical library, one or more independent hard disk drives, multiple hard disk drives in a redundant array of independent disks (RAID), solid-state drives (SSD), or random-access memory (RAM). Similarly, information repository 114 and information repository 134 may be implemented with any suitable storage architecture known in the art, such as a relational database, an object-oriented database, or one or more tables.

Figure 2:
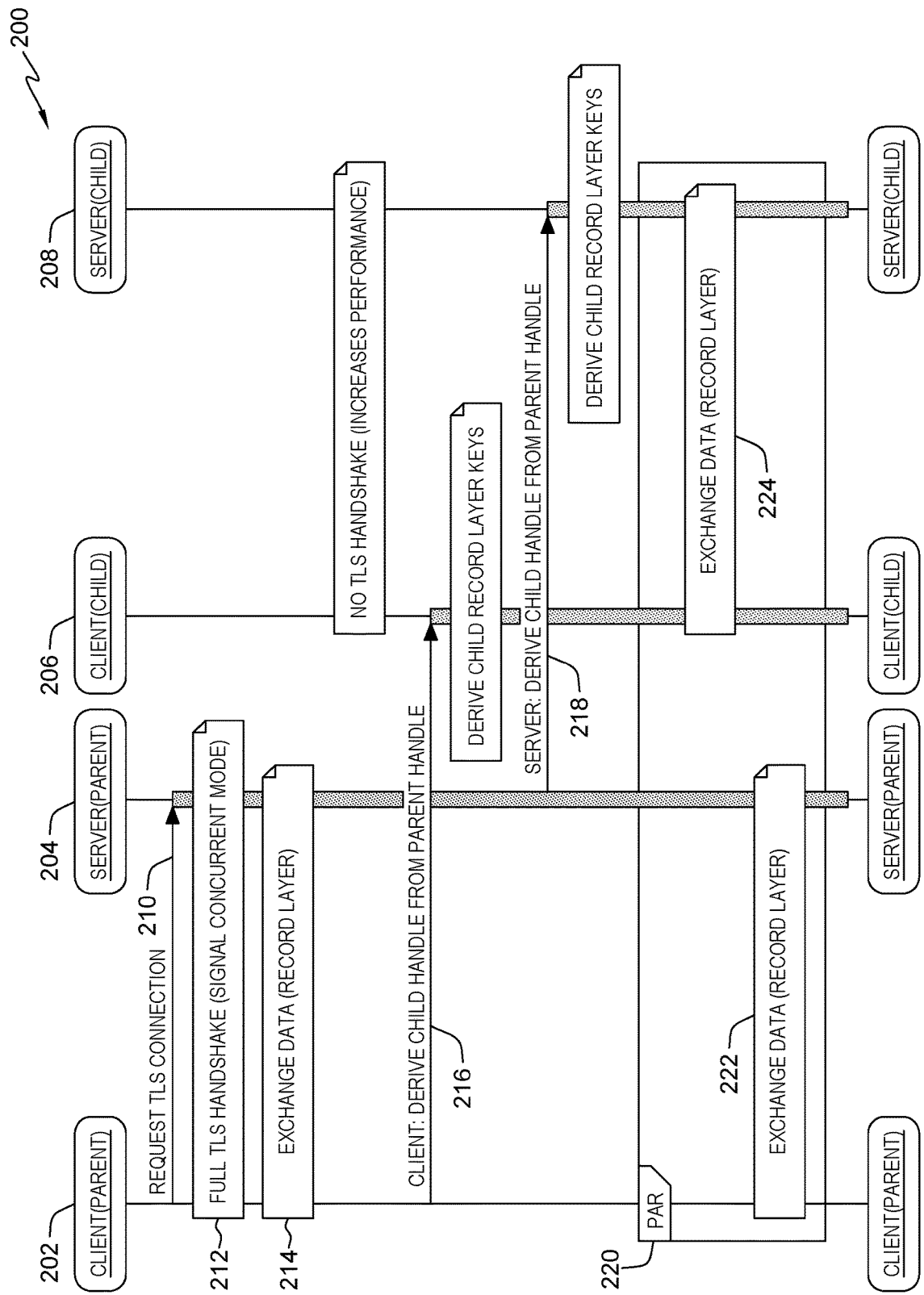
FIG. 2 is a network sequence diagram representing an example of a simplified sequence of the function of the present invention where the number of concurrent connections is two (one parent and one child), in accordance with an embodiment of the present invention.

FIG. 2 is a network sequence diagram, generally designated 200, representing an example of a simplified sequence of the function of the present invention where the number of concurrent connections is two (one parent and one child), in accordance with an embodiment of the present invention. In some embodiments, the present invention may have one parent and N child concurrent sessions.

Network sequence diagram 200 includes a client and a server, and two concurrent connections, a parent connection and a child connection. The parent connection on the client side is denoted as Client(Parent) 202, the parent connection on the server side is denoted as Server(Parent) 204, the child connection on the client side is denoted as Client(Child) 206, and the child connection on the server side is denoted as Server(Child) 208. In the example of FIG. 2, both the client and the server each runs an instance of concurrent TLS streams program 112. In this example, the client, i.e., Client(Parent) 202 and Client(Child) 206, runs instance concurrent TLS streams program 112-2, while the server, i.e., Server(Parent) 204 and Server(Child) 208, runs instance concurrent TLS streams program 112-1.

In the example of FIG. 2, the sequence begins when Client(Parent) 202 requests a TLS connection via Request 210. As a result of Request 210, a full TLS handshake occurs between Client(Parent) 202 and Server(Parent) 204, as noted in Handshake 212. Once the handshake is complete, and the connection established, normal data exchanges take place between Client(Parent) 202 and Server(Parent) 204, as noted in Exchange 214. At some point, additional child connections are initiated at Client(Parent) 202, but with the present invention, no full TLS handshake is required with the server for the child connections. As shown in Step 216, since no full handshake is required, the performance of the connections is increased.

In the present invention, instead of a full TLS handshake, the client derives a child handle from the parent handle of Client(Parent) 202, as shown in Step 216. In response to this step, Client(Child) 206 derives record layer keys based on the parent keys. In the TLS protocol, the record refers to the data exchange phase of the TLS connection. For the concurrent child sessions, session/connection keys for symmetric encryption are produced by iterating a KDF on the initial session key and each connection key is assigned to a concurrent peer connection.

Likewise, the server derives a child handle for Server (Child) 208 from the parent handle of Server(Parent) 204, as shown in Step 218. In response to this step, Server(Child) 208 derives record layer keys using the KDF on the initial parent session key, as shown in Parallel Process 220. In this way, both peers, the client and the server, have matching keys without the need for a full TLS handshake for each child connection.

Once the child record layer keys have been derived by both the client and the server, Parallel Process 220 allows for a continuous data exchange on the parent connection, as shown by Parent Data Exchange 222, and a continuous data exchange on the child connection, as shown by Child Data Exchange 224.

Figure 3:
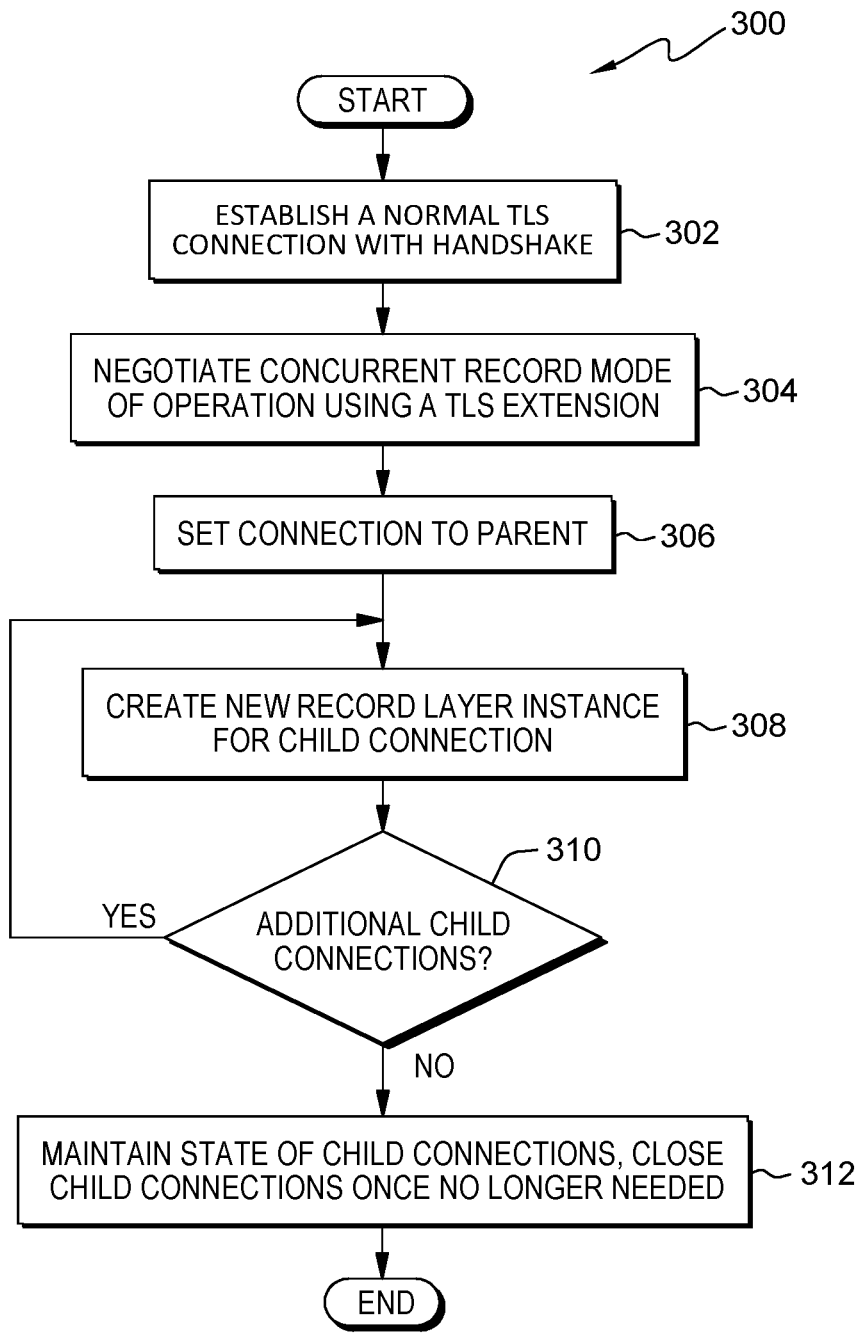
FIG. 3 is a flowchart depicting operational steps performed by the concurrent TLS streams program on a computing device within the distributed data processing environment of FIG. 1, for efficient concurrent TLS data streams, in accordance with an embodiment of the present invention.

FIG. 3 is a flowchart depicting operational steps performed by concurrent TLS streams program 112 on a computing device within the distributed data processing environment 100 of FIG. 1, for efficient concurrent TLS data streams, in accordance with an embodiment of the present invention.

In an alternative embodiment, the steps of workflow 300 may be performed by any other program while working with concurrent TLS streams program 112. It should be appreciated that embodiments of the present invention provide at least for efficient concurrent TLS data streams. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, the steps of workflow 300 are performed by two instances of concurrent TLS streams program 112, one instance, concurrent TLS streams program 112-1, on the server, i.e., server computing device 110 from FIG. 1, and one instance, concurrent TLS streams program 112-2, on the client, i.e., client computing device 130 from FIG. 1.

In an embodiment, concurrent TLS streams program 112 establishes a normal TLS connection with a full handshake. In an embodiment, concurrent TLS streams program 112 negotiates a concurrent record mode of operation using a TLS extension. In an embodiment, concurrent TLS streams program 112 sets this connection to be a parent connection with a new attribute setting to denote the parent/child concurrence. In an embodiment, concurrent TLS streams program 112 opens a new socket for the child connection. In an embodiment, concurrent TLS streams program 112 determines if there are additional child connections to be established between the client and the server. In an embodiment, each peer, i.e., the client and the server, maintains state about the child connections that are created so that child connections are using the correct keys and also closes the child connections once data is exchanged securely and connection is no longer needed.

It should be appreciated that the process depicted in FIG. 3 illustrates one possible iteration of the operational steps performed by concurrent TLS streams program 112 for efficient concurrent TLS data streams, which repeats each time a client requests a TLS connection in the network. FIG. 3 illustrates one embodiment where the number of child connections to be established are known in advance and a loop is used until all child connections are established. In other embodiments, the child connection establishment is dynamic/on-demand and driven by application needs or increased workloads. In these embodiments, the applications can dynamically request creating child connections on demand based on changing workloads or data transfer requirements, and concurrent TLS streams program 112 would repeat steps 308 and 312 below for each new child connection requested, until all transfers on child connections for the parent connection have completed, and all child connections have been closed.

Concurrent TLS streams program 112 establishes a normal TLS connection with a full handshake (step 302). In an embodiment, concurrent TLS streams program 112 establishes a normal TLS connection with a full handshake, which will become the parent session connection. In an embodiment, the full handshake is performed between the instance of concurrent TLS streams program 112 on the client, i.e., concurrent TLS streams program 112-2, and the instance of concurrent TLS streams program 112 on the server, i.e., concurrent TLS streams program 112-1. In an embodiment, concurrent TLS streams program 112 uses an API call to open the socket.

Concurrent TLS streams program 112 negotiates a concurrent record mode of operation using a TLS extension (step 304). In an embodiment, the concurrent record mode of operation is negotiated between instance concurrent TLS streams program 112-2 on the client and instance concurrent TLS streams program 112-1 on the server. In an embodiment, concurrent TLS streams program 112 uses the Generate Random Extensions And Sustain Extensibility (GREASE) TLS extension, since the GREASE extension is unblockable. In another embodiment, concurrent TLS streams program 112 may use any other appropriate TLS extension as would be known to a person of skill in the art. In an embodiment, concurrent TLS streams program 112 uses a random number with an embedded signal to indicate support for concurrent mode of operation and also to stop middlebox blocking. Middleboxes are intermediaries interposed between communicating hosts, often without the knowledge of either party to the connection. In an embodiment, concurrent TLS streams program 112 uses an API call to perform the full handshake.

Concurrent TLS streams program 112 sets the connection to parent (step 306). In an embodiment, concurrent TLS streams program 112 sets this connection to be a parent connection with a new attribute setting to denote the parent/child concurrence. In an embodiment, the connection is set to parent by instance concurrent TLS streams program 112-2 on the client and instance concurrent TLS streams program 112-1 on the server.

Concurrent TLS streams program 112 creates a new record layer instance for a child connection (step 308). In an embodiment, concurrent TLS streams program 112 opens a new socket for the child connection. In an embodiment, concurrent TLS streams program 112 then sets an attribute connecting the current child socket handle to the handle of the existing parent connection. In an embodiment, concurrent TLS streams program 112 skips the handshake roundtrip and directly iterates the TLS KDF to produce new record layer keys from the parent session connection, i.e., no handshake will occur at all. In an embodiment, the new record layer instances are created by the instance of TLS streams program 112 on the client and are acknowledged by the instance of TLS streams program 112 on the server.

In an embodiment, concurrent TLS streams program 112 derives the new TLS application traffic keys for both server and client as per section 7.2 and 7.3 of RFC 8446. In an embodiment, concurrent TLS streams program 112 uses an API call to derive the new TLS application traffic keys for both server and client.

In an embodiment, the individual socket connections on child sockets operate concurrently for read and write operations and close when done as normal.

Concurrent TLS streams program 112 determines if there are additional child connections (decision block 310). In an embodiment, concurrent TLS streams program 112 determines if there are additional child connections to be established between the client and the server. In an embodiment, if concurrent TLS streams program 112 determines that there are additional child connections to be established between the client and the server ("yes" branch, decision block 310), then concurrent TLS streams program 112 returns to step 308 to establish the next connection. In an embodiment, if concurrent TLS streams program 112 determines that there are no additional child connections to be established between the client and the server ("no" branch, decision block 310), then concurrent TLS streams program 112 proceeds to step 312.

Concurrent TLS streams program 112 maintains the state of the child connections and closes the child connections once they are no longer needed (step 312). In an embodiment, the instance of concurrent TLS streams program 112 on each peer, i.e., the client and the server, maintains state information about the child connections that are created so that child connections are using the correct keys and also closes the child connections once data is exchanged securely and connection is no longer needed.

Figure 4:
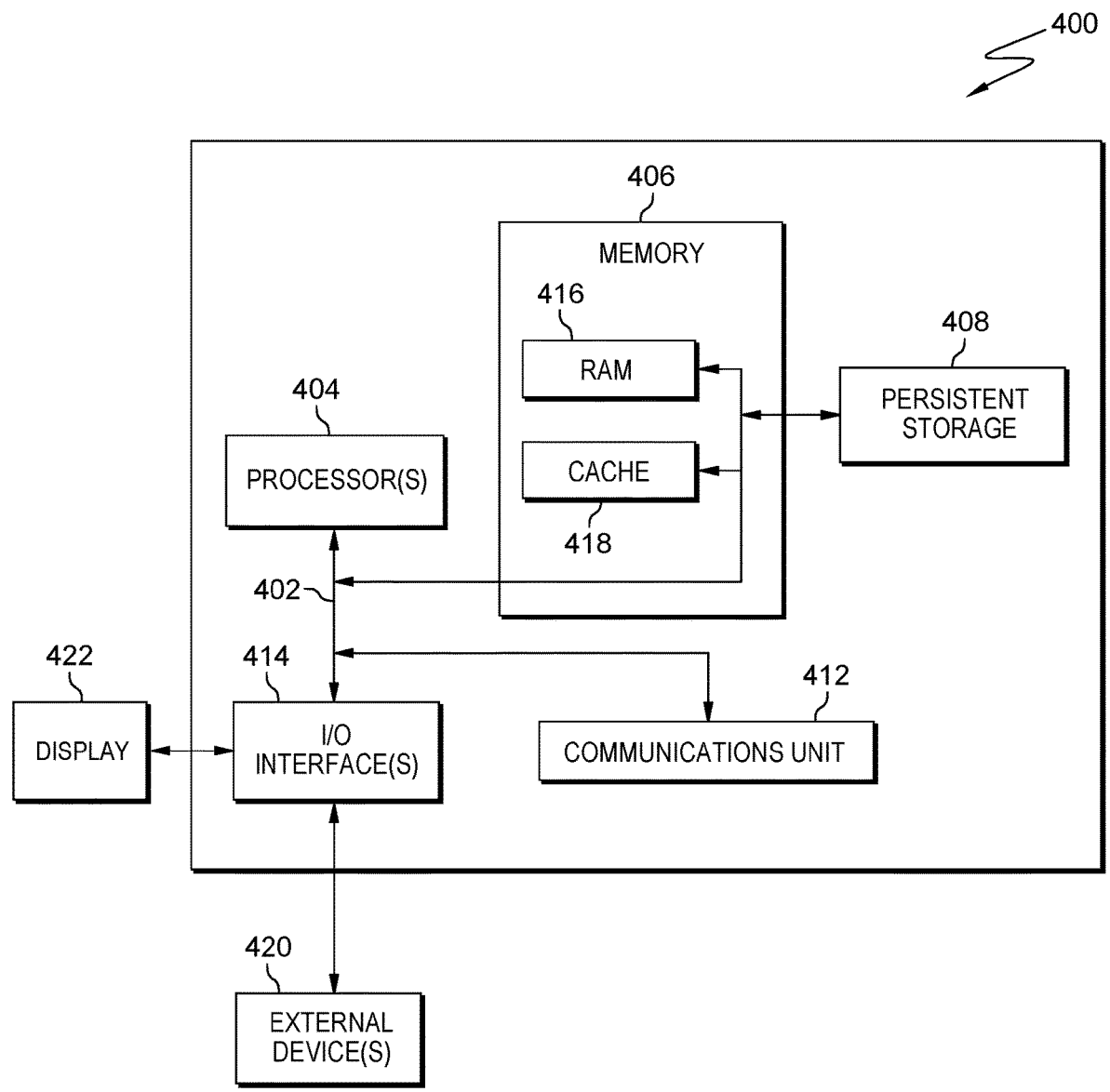
FIG. 4 depicts a block diagram of components of the computing devices executing the concurrent TLS streams program within the distributed data processing environment of FIG. 1, in accordance with an embodiment of the present invention.

FIG. 4 is a block diagram depicting components of server computing device 110 and client computing device 130, suitable for concurrent TLS streams program 112, in accordance with at least one embodiment of the invention. FIG. 4 displays computer 400; one or more processor(s) 404 (including one or more computer processors); communications fabric 402; memory 406, including random-access memory (RAM) 416 and cache 418; persistent storage 408; communications unit 412; I/O interfaces 414; display 422; and external devices 420. It should be appreciated that FIG. 4 provides only an illustration of one embodiment and does not imply any limitations with regard to the environments in which different embodiments may be implemented. Many modifications to the depicted environment may be made.

As depicted, computer 400 operates over communications fabric 402, which provides communications between computer processor(s) 404, memory 406, persistent storage 408, communications unit 412, and I/O interface(s) 414. Communications fabric 402 may be implemented with any architecture suitable for passing data or control information between processors 404 (e.g., microprocessors, communications processors, and network processors), memory 406, external devices 420, and any other hardware components within a system. For example, communications fabric 402 may be implemented with one or more buses.

Memory 406 and persistent storage 408 are computer readable storage media. In the depicted embodiment, memory 406 comprises RAM 416 and cache 418. In general, memory 406 can include any suitable volatile or non-volatile computer readable storage media. Cache 418 is a fast memory that enhances the performance of processor(s) 404 by holding recently accessed data, and near recently accessed data, from RAM 416.

Program instructions for concurrent TLS streams program 112 may be stored in persistent storage 408, or more generally, any computer readable storage media, for execution by one or more of the respective computer processors 404 via one or more memories of memory 406. Persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. In the context of some embodiments of the present invention, the source of the various input data may be physically remote to computer 400 such that the input data may be received, and the output similarly transmitted via communications unit 412.

I/O interface(s) 414 allows for input and output of data with other devices that may be connected to computer 400. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., concurrent TLS streams program 112, can be stored on such portable computer readable storage media and can be loaded onto persistent storage 408 via I/O interface(s) 414. I/O interface(s) 414 also connect to display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for concurrent Transport Layer Security (TLS) streams, the computer-implemented method comprising:
    establishing, by one or more computer processors, a connection between a client device and a server by performing a normal TLS handshake;
    setting, by the one or more processors, the connection as a parent connection with a new attribute setting to denote a parent/child occurrence;
    negotiating, by the one or more computer processors, a concurrent mode of operation, wherein one or more child connections are established without using the TLS handshake;
    associating, by the one or more computer processors, the one or more child connections to the parent connection; and
    deriving, by the one or more computer processors, child application traffic secrets for each child connection of the one or more child connections from application traffic secrets of the parent.

2. The computer-implemented method of claim 1, wherein establishing, by the one or more computer processors, the parent connection by performing the normal TLS handshake further comprises:
    performing, by the one or more computer processors, the normal TLS handshake using standard TLS Application Programming Interface (API) calls.

3. The computer-implemented method of claim 1, wherein negotiating, by the one or more computer processors, the concurrent mode of operation, wherein the one or more child connections are established without using the TLS handshake further comprises:
    negotiating, by the one or more computer processors, the concurrent mode of operation using an unblockable TLS extension.

4. The computer-implemented method of claim 3, wherein negotiating, by the one or more computer processors, the concurrent mode of operation using the unblockable TLS extension further comprises:
    using, by the one or more computer processors, a random number with an embedded signal to indicate support for the concurrent mode of operation, wherein the random number also prevents middlebox blocking.

5. The computer-implemented method of claim 1, wherein associating, by the one or more computer processors, the one or more child connections to the parent connection further comprises:
    opening, by the one or more computer processors, a new socket for each child connection of the one or more child connections;
    setting, by the one or more computer processors, an attribute for a current child socket handle for each child connection to a handle of the parent connection based on the new attribute setting; and
    creating, by the one or more computer processors, a new record layer key for each child connection using TLS Key-Derivation Functions (KDF), wherein the TLS KDF directly creates the new record layer key without using the TLS handshake.

6. The computer-implemented method of claim 5, further comprising:
    maintaining, by the one or more computer processors, a state information for each child connection of the one or more child connections, wherein the state information is maintained to ensure that each child connection uses a correct new record layer key; and
    responsive to determining that a data exchange for a specific child connection is complete, closing, by the one or more computer processors, the specific child connection.

7. The computer-implemented method of claim 1, wherein each child connection of the one or more child connections operates concurrently for one or more read operations and one or more write operations.

8. A computer program product for concurrent Transport Layer Security (TLS) streams, the computer program product comprising one or more computer readable storage media and program instructions stored on the one or more computer readable storage media, the program instructions including instructions to:
    establish a connection between a client device and a server by performing a normal TLS handshake;
    set the connection as a parent connection with a new attribute setting to denote a parent/child occurrence;
    negotiate a concurrent mode of operation, wherein one or more child connections are established without using the TLS handshake;
    associate the one or more child connections to the parent connection; and derive child application traffic secrets for each child connection of the one or more child connections from application traffic secrets of the parent.

9. The computer program product of claim 8, wherein establish the parent connection by performing the normal TLS handshake further comprises the one or more program instructions, stored on the one or more computer readable storage media, to:
perform the normal TLS handshake using standard TLS Application Programming Interface (API) calls.

10. The computer program product of claim 8, wherein negotiate the concurrent mode of operation, wherein the one or more child connections are established without using the TLS handshake further comprises the one or more program instructions, stored on the one or more computer readable storage media, to:
negotiate the concurrent mode of operation using an unblockable TLS extension.

11. The computer program product of claim 10, wherein negotiate the concurrent mode of operation using the unblockable TLS extension further comprises the one or more program instructions, stored on the one or more computer readable storage media, to:
use a random number with an embedded signal to indicate support for the concurrent mode of operation, wherein the random number also prevents middlebox blocking.

12. The computer program product of claim 8, wherein associate the one or more child connections to the parent connection further comprises the one or more program instructions, stored on the one or more computer readable storage media, to:
open a new socket for each child connection of the one or more child connections;
set an attribute for a current child socket handle for each child connection to a handle of the parent connection based on the new attribute setting; and
create a new record layer key for each child connection using TLS Key-Derivation Functions (KDF), wherein the TLS KDF directly creates the new record layer key without using the TLS handshake.

13. The computer program product of claim 12, further comprising the one or more program instructions, stored on the one or more computer readable storage media, to:
maintain a state information for each child connection of the one or more child connections, wherein the state information is maintained to ensure that each child connection uses a correct new record layer key; and
responsive to determining that a data exchange for a specific child connection is complete, close the specific child connection.

14. The computer program product of claim 8, wherein each child connection of the one or more child connections operates concurrently for one or more read operations and one or more write operations.

15. A computer system for concurrent Transport Layer Security (TLS) streams, the computer system comprising:
one or more computer processors;
one or more computer readable storage media; and
program instructions stored on the one or more computer readable storage media for execution by at least one of the one or more computer processors, the stored program instructions including instructions to:
establish a connection between a client device and a server by performing a normal TLS handshake;
set the connection as a parent connection with a new attribute setting to denote a parent/child occurrence;
negotiate a concurrent mode of operation, wherein one or more child connections are established without using the TLS handshake;
associate the one or more child connections to the parent connection; and
derive child application traffic secrets for each child connection of the one or more child connections from application traffic secrets of the parent.

16. The computer system of claim 15, wherein establish the parent connection by performing the normal TLS handshake further comprises the one or more program instructions, stored on the one or more computer readable storage media, to:
perform the normal TLS handshake using standard TLS Application Programming Interface (API) calls.

17. The computer system of claim 15, wherein negotiate the concurrent mode of operation, wherein the one or more child connections are established without using the TLS handshake further comprises the one or more program instructions, stored on the one or more computer readable storage media, to:
negotiate the concurrent mode of operation using an unblockable TLS extension.

18. The computer system of claim 17, wherein negotiate the concurrent mode of operation using the unblockable TLS extension further comprises the one or more program instructions, stored on the one or more computer readable storage media, to:
use a random number with an embedded signal to indicate support for the concurrent mode of operation, wherein the random number also prevents middlebox blocking.

19. The computer system of claim 15, wherein associate the one or more child connections to the parent connection further comprises the one or more program instructions, stored on the one or more computer readable storage media, to:
open a new socket for each child connection of the one or more child connections;
set an attribute for a current child socket handle for each child connection to a handle of the parent connection based on the new attribute setting; and
create a new record layer key for each child connection using TLS Key-Derivation Functions (KDF), wherein the TLS KDF directly creates the new record layer key without using the TLS handshake.

20. The computer system of claim 19, further comprising the one or more program instructions, stored on the one or more computer readable storage media, to:
maintain a state information for each child connection of the one or more child connections, wherein the state information is maintained to ensure that each child connection uses a correct new record layer key; and
responsive to determining that a data exchange for a specific child connection is complete, close the specific child connection.

* * * * *